United States Patent [19]
Morbitzer

[11] Patent Number: 5,825,276
[45] Date of Patent: Oct. 20, 1998

[54] TEMPERATURE SENSOR WITH IMPROVED ADJUSTMENT MOBILITY

[75] Inventor: Hans-Peter Morbitzer, Langenlebarn, Austria

[73] Assignee: Electrovac, Fabrikation Elektrotechnischer Spezialartikel Gesellschaft M.B.H., Klosterneuburg, Austria

[21] Appl. No.: 607,941

[22] Filed: Feb. 28, 1996

[30] Foreign Application Priority Data

Feb. 28, 1995 [AT] Austria ........................ 361/95

[51] Int. Cl.$^6$ .................................................. H01H 37/48
[52] U.S. Cl. ............................................. 337/394; 337/382
[58] Field of Search ..................... 337/388, 382, 337/392, 394; 374/132, 187, 208–210; 219/449, 443, 450, 458

[56] References Cited

U.S. PATENT DOCUMENTS 3,732,518  5/1973  Them .
4,215,332  7/1980  Wharton .
5,527,111  6/1996  Lysen et al. ........................... 374/208

FOREIGN PATENT DOCUMENTS 386690   2/1988   Austria .
2149973  6/1985   United Kingdom .
2156157  10/1985  United Kingdom .
2205687  12/1988  United Kingdom .

*Primary Examiner*—Leo P. Picard
*Assistant Examiner*—Jayprakash N. Gandhi
*Attorney, Agent, or Firm*—Henry M. Feiereisen

[57] ABSTRACT

A temperature sensor includes a spring-biased tube of relatively low thermal expansion and a rod arranged in the tube and having relatively high thermal expansion for cooperation with a contact mechanism to control a heat-operated system. Secured to the tube on one end thereof which is proximate to the contact mechanism is a substantially hemispherical end piece for placement in a concave receptacle that is arched in direction of the contact mechanism and traversed by the rod.

6 Claims, 1 Drawing Sheet

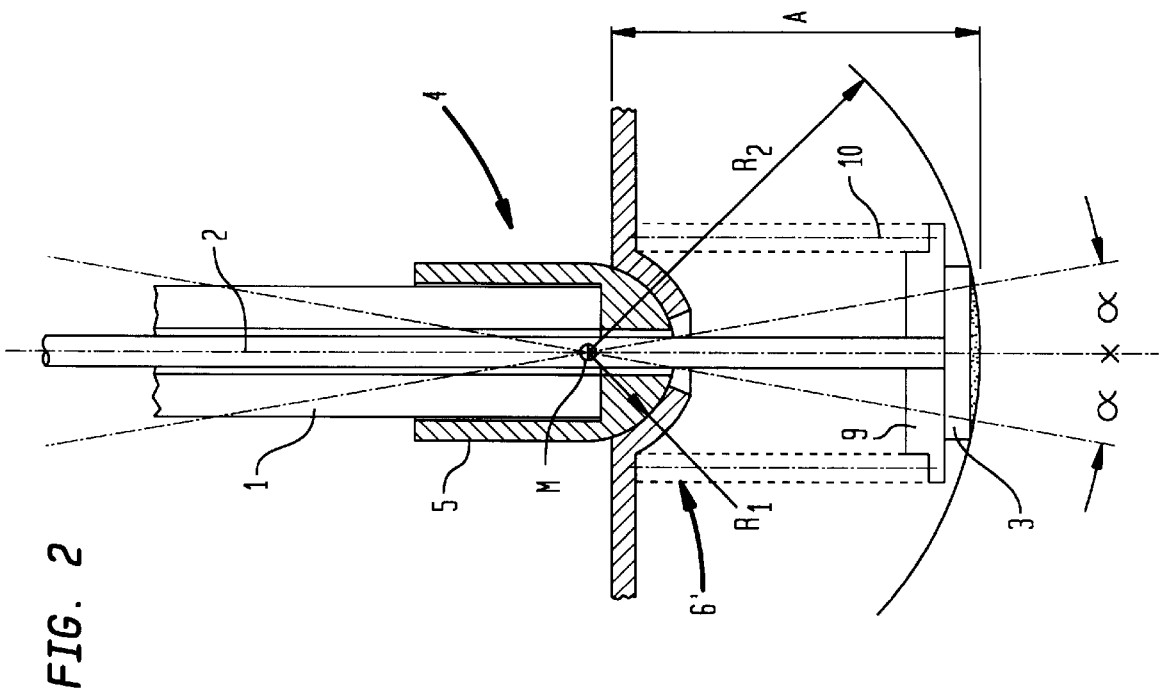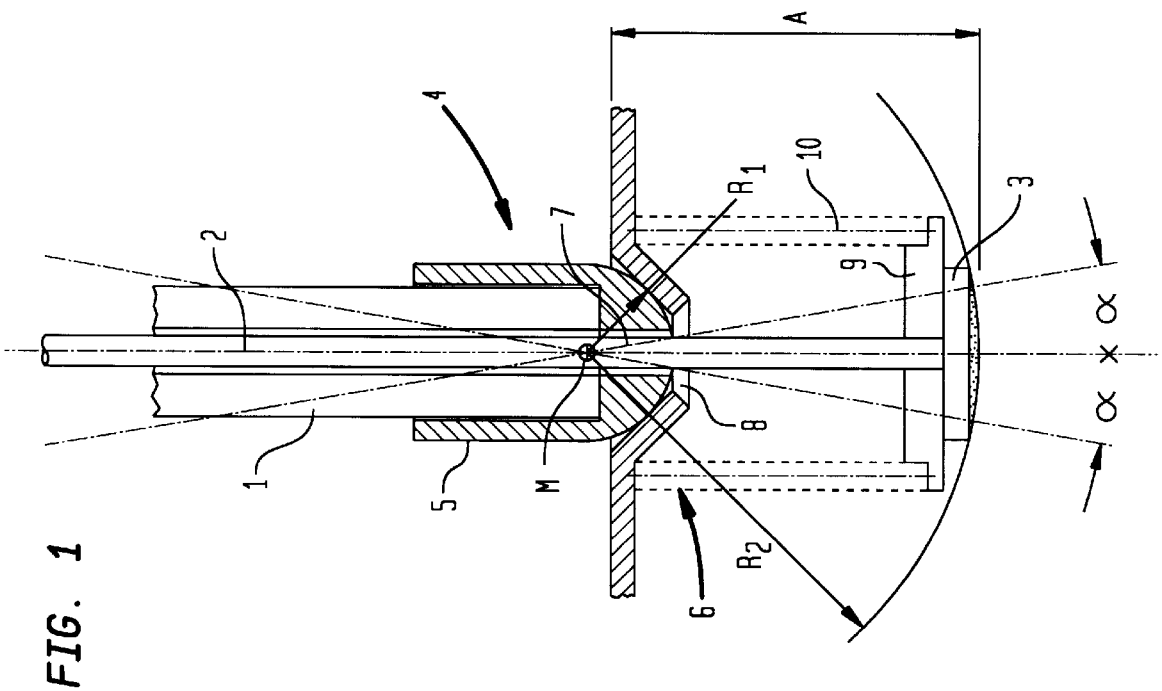

TEMPERATURE SENSOR WITH IMPROVED ADJUSTMENT MOBILITY

BACKGROUND OF THE INVENTION

The present invention refers to a temperature sensor, and in particular to a temperature sensor of a type including a rod of relatively high thermal expansion which is arranged in a tube of relatively low thermal expansion and cooperates with a contact mechanism to control a heat-operated system, with the contact-proximate end of the tube being spring-biased for placement in a concave receptacle that is arched in direction toward the contact mechanism.

Austrian Pat. No. 386,690 discloses an apparatus for controlling the temperature of heating units of electric cooking appliances, with a temperature sensor that cooperates with a contact mechanism so that the heater circuit is on at a certain temperature and cut at a particular higher temperature. In this conventional temperature sensor, the contact-proximate end of the tube is directly received in the concave receptacle so as to form a joint by which angular errors can be compensated during installation of the sensor and to thereby ensure a secure actuation of the contacts even when the sensor is improperly installed.

This conventional temperature sensor has the drawback that the tube bears with its ring-shaped cross section at substantial contact pressure upon the receptacle so that the perimeter of the tube cuts into the surface of the receptacle. This results in formation of a groove which impairs the functionality of the joint and thus the mobility of the tube in the receptacle.

SUMMARY OF THE INVENTION

It is an object of the present invention to provide an improved temperature sensor, obviating the aforestated drawbacks.

In particular, it is an object of the present invention to provide an improved temperature sensor which ensures a pivoting and mobility of the tube in the receptacle even after extended use.

These objects and others which will become apparent hereinafter are attained in accordance with the present invention by securing over the receptacle-proximate end of the tube a substantially hemispherical end piece which is received in the concave receptacle and traversed by the rod.

By interposing an end piece between the receptacle-proximate end of the tube and the receptacle, the tube is prevented from bearing upon the receptacle with a sharp edge. The provision of the hemispherical end piece prevents excessive contact pressure so that the risk of seizing by the tube and by the hemispherical end piece in the receptacle is substantially eliminated.

Suitably, the end piece is configured of substantially hemispherical shape. However, it is certainly within the scope of the present invention to form the end piece of a configuration that deviates from the spherical configuration, e.g. elliptical shape, as long as a seizing in the tube is safely prevented.

According to a further feature of the invention, the receptacle has a surface area which in each contact point with the end piece has a curvature which is equal to or flatter as the spherical surface of the convex hemispherical end piece, or has an angle of inclination that is equal to or flatter as the tangential area of the end piece at each contact point. This configuration avoids the formation of sharp edges that can seize in the receptacle, thereby ensuring the mobility of the tube with respect to the receptacle even after extended use of the sensor.

In accordance with a variation of the present invention, the end piece has a hemispherical shape and is received in a hemispherical receptacle of same radius. The thus-formed ball-and-socket joint enables the tube to be positioned at different angles relative to the normal position while still assuming its function. The large spherical contact area between the end piece and the receptacle prevents a seizing of the end piece in the receptacle.

According to another feature of the present invention, the concave receptacle may also be configured in form of a truncated cone, with the conical area of the receptacle forming a tangent with the spherical end piece. Although the configuration of the receptacle in form of a truncated cone results in only a line contact between the end piece and the receptacle so that the end piece may cut in the receptacle, this, however, is negligible because the forming bearing area assumes a spherical configuration so that the mobility of the tube is not impaired.

Preferably, the substantially hemispherical end piece is formed with a sleeve-like projection which is placed over the receptacle-proximate end of the tube to secure the end piece to the tube end in a simple manner.

BRIEF DESCRIPTION OF THE DRAWING

The above and other objects, features and advantages of the present invention will now be described in more detail with reference to the accompanying drawing in which:

FIG. 1 is a schematic, partially sectional view of one embodiment of a temperature sensor according to the invention; and FIG. 2 is a schematic, partially sectional view of another embodiment of a temperature sensor according to the invention.

DETAILED DESCRIPTION OF PREFERRED EMBODIMENTS

Throughout all the Figures, the same or corresponding elements are generally indicated by the same reference numerals.

Turning now to the drawing, and in particular to FIG. 1, there is shown a schematic, partially sectional view of one embodiment of a temperature sensor according to the invention, including a tube 1 made of a material which has a relatively low thermal expansion coefficient, e.g. quartz, glass or ceramics. Arranged coaxially within the tube 1 is a rod 2 which is made of metal to exhibit a relatively high thermal expansion coefficient. Although not shown in detail in the drawing, the temperature sensor may be part of a temperature-responsive device, e.g. thermostat, for controlling the temperature of heat sources to maintain a desired temperature by actuating a contact or switch mechanism which is controlled by the rod 2 via a transmission member. An exemplified thermostat is disclosed e.g. in Austrian Pat. No. 386,690 or in U.S. Pat. No. 4,555,688. Thus, the heating circuit of the heat source, such as radiator or cooking range, is connected at one given temperature and disconnected at a given higher temperature through operation of the temperature sensor. The contact mechanism and transmission member, like much other components, do not form part of the present invention, and thus have been omitted from the Figures for the sake of simplicity.

At their one axial ends which are not illustrated in the drawing, the tube 1 and the rod 2 are joined together. The other end of the rod 2 projects beyond the other end of the tube 1 by a distance indicated by reference character A and is formed with a collar 3 which is in direct contact with the transmission member (not shown) that actuates a switch or contacts of the contact mechanism to regulate the temperature. Thus, temperature fluctuations in the area of the tube 1 result in a change of the rod length that projects beyond the tube 1. For example, if the heating circuit is on, the radiating heat increases the temperature, and the rod 2 expands. At a certain point, the lengthening of the rod 2 causes the transmission member to move toward a point of actuation so that the contacts of the contact mechanism are opened and the heating circuit is cut. When the rod 2 decreases in length during following cooling, the contacts close again at a certain point to restart the heating action.

As shown in FIG. 1, the collar 3 of the rod 2 carries a spring plate 9 for supporting one end of a spring 10. The other end of the spring 10 is supported by a structural element that forms part of the temperature-responsive device and exhibits a concave socket or receptacle 6 so that the spring 10 urges the tube 1 via the rod 2 in direction of the receptacle 6.

The receptacle-proximate end of tube 1 is received in an end piece 4 of hemispherical shape which is formed with a sleeve-like projection 5 that is pushed over the end of tube 1. Thus, the contact-proximate end of the tube 1 is received within the concave receptacle 6 via the end piece 4. In order to allow a passage of the rod 2, the end piece 4 and the receptacle 6 are formed with aligned bores 7, 8 of suitable dimensions to enable a tilting of the tube 1 and the rod 2 within the receptacle 6 about an angle α, as indicated in the drawing.

In the embodiment of the temperature sensor according to FIG. 1, the receptacle 6 is of truncated cone shaped configuration while in the embodiment of FIG. 2, the receptacle 6' is formed as a spherical socket. In both embodiments, the center M of the truncated cone shaped receptacle 6 or of the spherical receptacle 6', with radius $R_1$, coincides with the center of the sphere with radius $R_2$ that is formed at the end of rod 2 and the transmission member.

As the receptacle 6 is of truncated cone shaped configuration, only a line contact is formed between the end piece 4 and the conical receptacle 6. Still, a possible seizing of the end piece 4 in the receptacle 6 is insignificant as this results only in a reshaping of the truncated cone shaped receptacle 6 to assume a spherical manner so that the mobility of the tube 1 is fully retained.

In the embodiment of FIG. 2, the receptacle 6' is formed as a spherical socket so that the end piece 4 is supported all-around within the receptacle 6, thereby eliminating any risk of seizing. Preferably, both the spherical end piece 4 and the spherical receptacle 6' have the same radius $R_1$.

It will be appreciated by persons skilled in the art that the illustrated configurations of the receptacle are shown by way of example only. It is certainly within the scope of the present invention to configure the receptacle in any other suitable shape that prevents seizing which would reduce the mobility of the tube. A seizing is prevented as long as the surface of the concave receptacle 6, 6' has in each contact point with the hemispherical end piece 4 a same or flatter curvature as the spherical surface of the convex hemispherical end piece 4, or a same or flatter angle of inclination as the corresponding tangential area of the end piece 4 at the contact point.

While the invention has been illustrated and described as embodied in a temperature sensor, it is not intended to be limited to the details shown since various modifications and structural changes may be made without departing in any way from the spirit of the present invention.

What is claimed as new and desired to be protected by Letters Patent is set forth in the appended claims:

1. A temperature sensor, comprising:

a tube of relatively low thermal expansion;

a rod of relatively high thermal expansion, said rod being arranged in the tube and cooperating with a contact mechanism to control a heat-operated system, with the tube having one end in proximity of the contact mechanism; and a substantially hemispherical end piece secured to said one end of the tube and so contoured to substantially mate a concave configuration of a receptacle that receives the end piece, said receptacle being arched toward the contact mechanism and traversed by the rod, said tube being spring-biased in direction of the receptacle.

2. The temperature sensor of claim 1 wherein the receptacle has a surface area which in each contact point with the end piece exhibits a curvature which is equal to or flatter as the spherical surface of the end piece.

3. The temperature sensor of claim 1 wherein the receptacle has a surface area which in each contact point with the end piece exhibits an angle of inclination that is equal to or flatter as the tangential area of the end piece at the contact point.

4. The temperature sensor of claim 1 wherein the end piece exhibits a hemispherical configuration and defines a radius, said receptacle being of hemispherical configuration and defining a radius which corresponds to the radius of the hemispherical end piece.

5. The temperature sensor of claim 1 wherein the receptacle is of truncated cone shaped configuration, with the conical surface forming a tangential area with the end piece when the end piece is received in the receptacle.

6. The temperature sensor of claim 1 wherein the end piece is formed with a sleeve-like projection for placement over the tube with the end piece.

* * * * *